United States Patent
Ross et al.

(10) Patent No.: US 6,302,552 B1
(45) Date of Patent: Oct. 16, 2001

(54) ILLUMINATED POINTER WITH TUBULAR SHAFT

(75) Inventors: David Alan Ross, Columbiaville; Michael John Schnars, Howell; Douglas Jay King, Lapeer; Stephen Lynn Miller, Clarkston; Ronald Kenneth Selby, Flint, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 15 days.

(21) Appl. No.: 09/580,618

(22) Filed: May 30, 2000

(51) Int. Cl.[7] .................................................. F21V 8/00
(52) U.S. Cl. ................ 362/30; 362/23; 116/48; 116/288
(58) Field of Search .................. 362/23, 29, 30; 116/48, 288

(56) References Cited

U.S. PATENT DOCUMENTS

| | | | | |
|---|---|---|---|---|
| 5,142,456 | * | 8/1992 | Murphy | 362/29 X |
| 5,546,888 | * | 8/1996 | Skiver et al. | 362/23 X |
| 5,603,283 | * | 2/1997 | Owen | 116/284 |
| 5,706,757 | * | 1/1998 | Hashimoto et al. | 116/288 |

* cited by examiner

Primary Examiner—Laura K. Tso
(74) Attorney, Agent, or Firm—Jimmy L. Funke

(57) ABSTRACT

An illuminated pointer member for an instrument panel. A hollow tubular shaft member conveys light from a light source through its hollow interior to the pointer member for illumination. A rotating mechanism, such as a gear mechanism and/or motor mechanism is connected to the tubular member for rotating the tubular member and pointer member.

4 Claims, 1 Drawing Sheet

ILLUMINATED POINTER WITH TUBULAR SHAFT

TECHNICAL FIELD

The invention relates to illuminated pointer devices for instrument panels.

BACKGROUND OF THE INVENTION

Automotive instrument panels, such as on dashboards, radios, components and the like, usually employ a face plate having a body of transparent light conducting material and a decorative outer appliqué which includes legends and indicia for various knobs and gauges. Instrument gauges mounted behind the face plate have pointer members which are arranged to rotate or move along the indicia to reveal certain facts to the vehicle operator, such as vehicle speed, engine temperature, fuel level, and other vehicle parameters.

The instrument pointers are typically indirectly illuminated by lamps to afford visibility to the vehicle operator at night and low light conditions. The illumination typically is indirect and provided by lamps and lights arranged around the periphery of the face plate which conduct some light to each pointer. Typically, however, the light sources are positioned at a distance from the instrument pointers and light intensity is lost in the transition.

It is well known to provide illumination of instrument pointers by incorporating small lamps on the pointers themselves, or by using light conducting transparent pointer material optically coupled to a nearby light source. In the case of light conduction schemes, it is the usual practice to transmit light from a remote lamp to one or more transparent elements and into the pointer in such a manner that many reflections are required. As a result, only a small portion of the source light actually enters the pointer resulting in a low level of pointer illumination.

Previously, applying direct lighting to conventional gauges and instrument clusters has proven to be difficult in view of the presence of the motor and gears which are used rotate the pointer member and are positioned directly in back of the instrument panels. It also is difficult to provide pointer illumination that is sufficiently bright and will not change during pointer movement.

It thus is desirable to provide an instrument pointer mechanism for a vehicle instrument panel or the like which provides more usable light to the pointer than previously known. It is also an object of the present invention to provide pointer illumination which offers bright illumination as well as a light level which is independent of pointer angular position.

SUMMARY OF THE INVENTION

The present invention accomplishes these objects and others by illuminating a pointer member through a tubular shaft member which is positioned directly in the motor or gear mechanism. A light source located directly below the hollow shaft member provides illumination directly through the shaft member to the instrument pointer located at the opposite end.

The tubular shaft has a reflective surface along its length in order to prevent light from escaping. The pointer member is attached to one end of the shaft and the gear member or motor can be attached along the shaft or at the other end. The hollow tubular member permits the light to travel directly from the source to a light pick up and facet in the pointer member which then directs it down the visible portion of the pointer member.

The above and other objects, features, and advantages of the present invention will become apparent from the following detailed description of the invention when it is viewed in connection with the accompanying drawings and appended claims.

DESCRIPTION OF THE PREFERRED EMBODIMENT(S)

Figure 1:
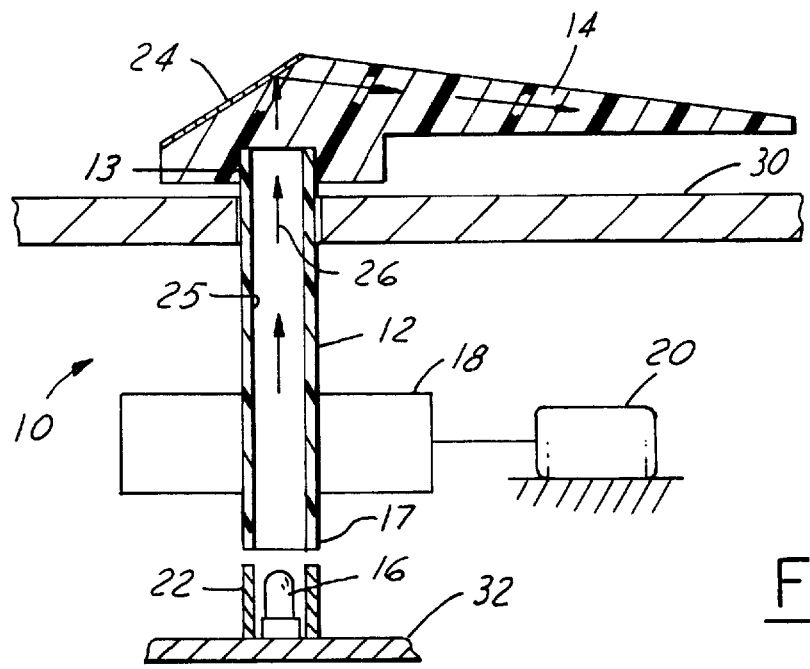
FIG. 1 illustrates a preferred embodiment of the present invention.

FIG. 1 illustrates a preferred embodiment of the present invention. The mechanism is indicated generally by the reference numeral 10. The mechanism 10 includes a hollow tubular shaft member 12 and a pointer member 14 attached at one end 13. Illumination from a light source 16, such as an LED, light bulb, or the like, is directed through the hollow center of the tubular member 12 and to the pointer member 14. A gear member 18 is attached to the shaft member, and the gear member in turn is connected to a motor 20 or the like which operates to rotate the gear member. When the motor operates or rotates the gear member, the tubular shaft member and pointer member are rotated along with it.

The light source 16 is preferably positioned in a socket or well 22 which directs the illumination up through the hollow center 25 of the tubular member toward the pointer member 14. The light source 16 is preferably positioned on a circuit board or other supporting surface 32.

An angled surface or facet 24 on the pointer member 14 deflects the light beams 26 emanating from the light source along the length of the pointer member 14. The illumination then is used to illuminate the pointer in front of the indicia or instrument panel 30 on which the mechanism 10 is positioned.

The present invention allows light from the light source 16, which is located directly below the hollow shaft member 12, to travel through the hollow center 25 of the shaft to the instrument pointer 14 located at the opposite end. The present invention can be used with various types of mechanisms, light sources, and pointer designs.

The tubular shaft member 12 can be manufactured in any conventional manner and preferably has a reflective surface of metal or plastic material in order to prevent light from escaping. The tubular shaft may incorporate various shapes including round, triangular, hexagon, octagon, etc. cross-sections. These materials provide a guide for the light and do not allow the light to escape radially through the walls. The reflective surface can be provided on the inner and outer surfaces of the tubular shaft member 12, or the shaft member can be made from a reflective material. Alternatively, various materials could be utilized inside the hollow tube to improve the transmission of light in the required manner.

Figure 2:
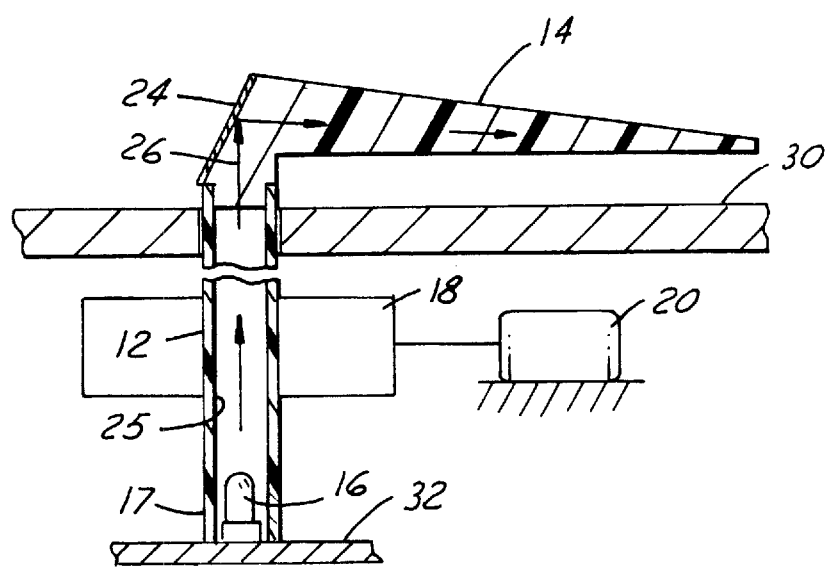
FIG. 2 illustrates an alternate embodiment of the invention.

FIG. 2 depicts an alternate embodiment of the invention. In this embodiment, the light source 16 is positioned directly inside the lower end 17 of the hollow tubular shaft member 12. In this manner, all of the light emanating from the light source 16 is used to illuminate the pointer member 14 and, in turn, the indicia on the instrument panel 30.

While particular embodiments of the invention have been shown and described, numerous variations and alternate embodiments will occur to those skilled in the art. Accordingly, it is intended that the invention be limited only in terms of the appended claims.

What is claimed is:

1. An illuminated indicator for an instrument panel comprising:
   a hollow tubular shaft member, said shaft member having a first end and a second end;
   a pointer member secured to said first end of said tubular shaft members, said pointer member having a body portion and a finger portion;
   a light source positioned adjacent said second end of said tubular member and positioned to direct light through the tubular member to the pointer member;
   a gear member attached to said hollow tubular member;
   a motor for rotating said gear member and said tubular shaft member along therewith;
   said tubular member having a reflective surface in order to prevent light directed through its hollow center from escaping.

2. The illuminated indicator as recited in claim 1 wherein said light source is positioned directly below and in axial alignment with said hollow tubular shaft member.

3. The illuminated indicator as recited in claim 1 wherein said light source is positioned inside said second end of said hollow tubular shaft member.

4. The illuminated indicator as recited in claim 1 further comprising a facet surface in said body portion of said pointer member for reflecting light from said light source down the length of said finger portion.

* * * * *